United States Patent
Brown et al.

(10) Patent No.: US 8,251,046 B2
(45) Date of Patent: Aug. 28, 2012

(54) FUEL SYSTEM FOR AN INTERNAL COMBUSTION ENGINE

(75) Inventors: Bradley Allen Brown, Leonard, MI (US); Larry Castleberry, Detroit, MI (US); Brien Lloyd Fulton, West Bloomfield, MI (US); Scott James Szymusiak, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/512,518

(22) Filed: Jul. 30, 2009

(65) Prior Publication Data

US 2011/0023832 A1    Feb. 3, 2011

(51) Int. Cl.
F02M 69/46   (2006.01)
F02M 37/04   (2006.01)
F02M 37/00   (2006.01)
F02M 69/04   (2006.01)

(52) U.S. Cl. ........ 123/456; 123/495; 123/514; 123/445; 123/446

(58) Field of Classification Search .......... 123/447, 123/456, 457, 468, 469, 470, 472, 478, 495, 123/514, 41.42, 510, 511, 446, 467; 136/30, 136/26; 239/128
See application file for complete search history.

(56) References Cited

U.S. PATENT DOCUMENTS

| | | | |
|---|---|---|---|
| 4,450,820 A * | 5/1984 | Haynes | 123/514 |
| 4,625,701 A * | 12/1986 | Bartlett et al. | 123/514 |
| 5,085,198 A * | 2/1992 | Bartlett et al. | 123/510 |
| 5,207,203 A * | 5/1993 | Wagner et al. | 123/514 |
| 5,253,628 A | 10/1993 | Brown | |
| 5,263,456 A * | 11/1993 | Owen-Evans | 123/495 |
| 5,269,276 A * | 12/1993 | Brown | 123/514 |
| 5,551,404 A * | 9/1996 | Bauerle et al. | 123/514 |
| 5,623,907 A * | 4/1997 | Cotton et al. | 123/456 |
| 5,626,121 A * | 5/1997 | Kushida et al. | 123/514 |
| 5,794,598 A * | 8/1998 | Janik et al. | 123/514 |
| 6,189,516 B1 * | 2/2001 | Hei Ma | 123/524 |
| 6,715,469 B2 * | 4/2004 | Ishimoto | 123/446 |
| 6,805,105 B2 * | 10/2004 | Kato et al. | 123/514 |
| 6,823,846 B2 * | 11/2004 | Mattes | 123/456 |
| 7,044,110 B2 * | 5/2006 | Geyer | 123/514 |
| 7,150,270 B2 * | 12/2006 | Hoffmann et al. | 123/514 |
| 2006/0231311 A1 * | 10/2006 | Fujii et al. | 180/200 |
| 2008/0172152 A1 * | 7/2008 | Fujino | 701/31 |
| 2008/0245346 A1 * | 10/2008 | Onishi et al. | 123/514 |
| 2009/0050109 A1 * | 2/2009 | Hoffmann et al. | 123/447 |

FOREIGN PATENT DOCUMENTS

DE    102006006557    * 8/2007

* cited by examiner

*Primary Examiner* — Stephen K Cronin
*Assistant Examiner* — Raza Najmuddin
(74) *Attorney, Agent, or Firm* — Julia Voutyras; Brooks Kushman P.C.

(57) ABSTRACT

A fuel system for a diesel engine has both a low pressure pump, which extracts fuel from the fuel tank, and a high pressure pump, which is fed by the low pressure pump and supplies fuel to fuel injectors. The fuel injectors supply fuel to the engine cylinders, with a small portion of fuel routed back into the fuel system. According to an embodiment of the present disclosure, the injector return fuel is routed into a low pressure fuel line between the low and high pressure fuel pumps, with return fuel from the fuel rails returned through a fuel cooler to the fuel tank. The low pressure fuel line has a filter disposed therein and the injector return fuel is returned to the low pressure fuel line upstream of the filter.

19 Claims, 1 Drawing Sheet

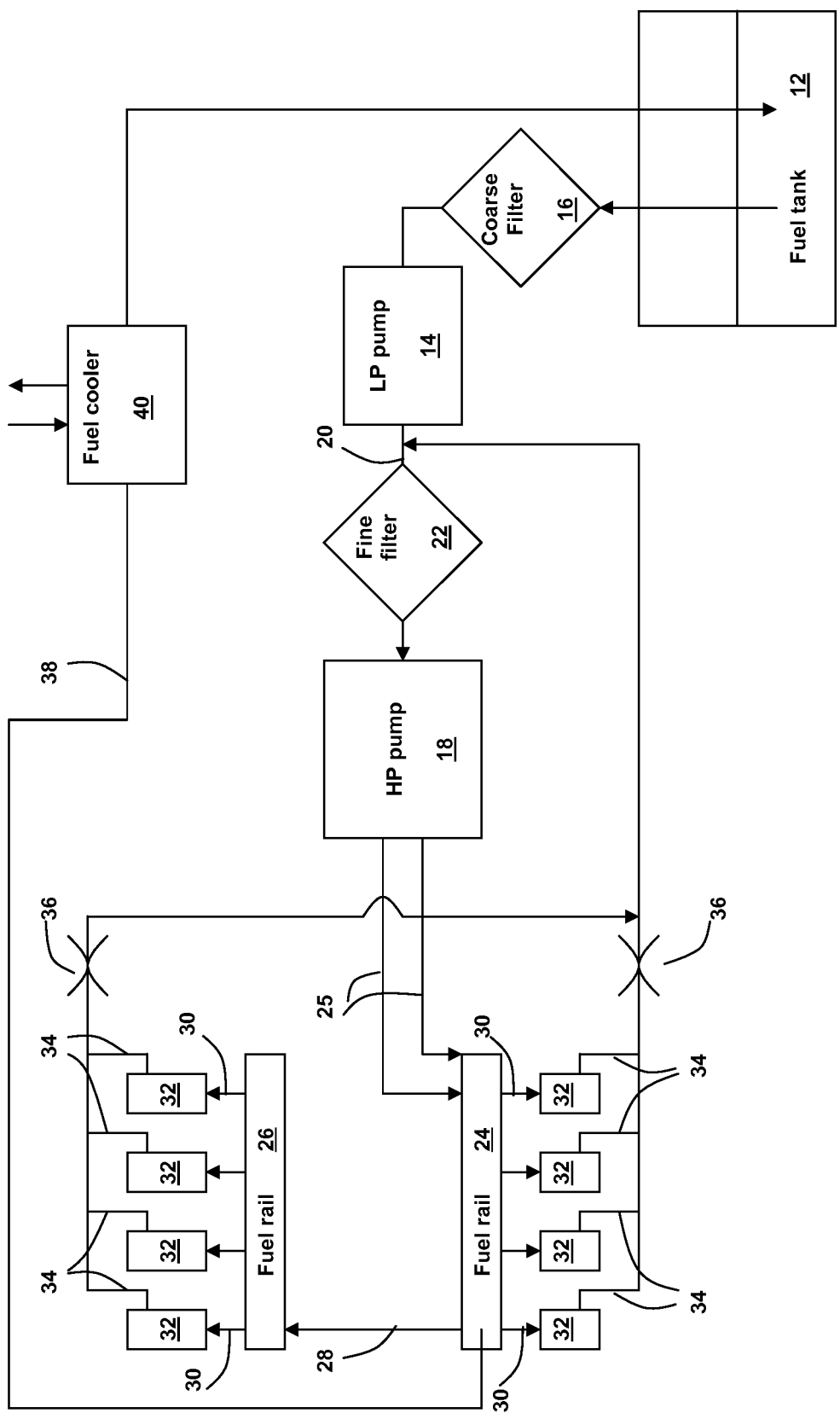

FUEL SYSTEM FOR AN INTERNAL COMBUSTION ENGINE

BACKGROUND

1. Technical Field

The present disclosure is related to fuel systems and the routing of return fuel from the fuel injectors and fuel rail(s).

2. Background Art

A variety of fuel systems are commonly used on diesel engines, including: common rail systems, mechanical and hydraulic unit injectors, and other systems that employ a low pressure feed pump supplying pressurized flow to the high pressure fuel system. The fuel injection event on these systems, commanded by the engine's electronic control unit, actuates the injector to allow fuel to spray through injector orifices into the combustion chamber. The injectors are designed such that a portion of the fuel delivered to the injectors is used to actuate the injector; the portion of fuel that used to actuate the injector is returned to a lower pressure portion of the fuel system.

In many prior art systems, fuel from the injector is returned to the fuel tank through return lines coupled to each injector. This reduces overall system efficiency because the low pressure feed pump(s) must pressurize the fuel again and deliver it to the injectors for subsequent combustion cycles. In addition, returning all the fuel to the tank will require a higher capacity pump.

Various types of injectors, such as piezoelectric injectors, do not operate well in the absence of a residual or priming pressure within the injector to bias internal components toward a desired starting position. These systems are more difficult to start when the return lines are coupled to the fuel tank as the residual pressure is essentially atmospheric pressure, which allows internal components to "collapse." The problem is exacerbated when air is ingested in the fuel system. Ingested air is very difficult to purge without injectors operating properly.

In other prior art, a return line from a fuel injector is coupled to a low pressure line between a high pressure pump and a low pressure fuel supply pump (or lift pump). In the prior art, two fine filters are provided, one upstream of where the return line tees into the low pressure line and one in the fuel return line. Each filter is replaced on a particular interval, which involves additional cost to maintain and replace. Furthermore, each component in the system has connectors which can present an opportunity for leakage: during operation if not properly secured, during operation due to loosening or damage, and during maintenance.

The fuel returned from the fuel injectors and common rail is heated by pressurization as well as its proximity to hot engine components. The fuel supplied from the low pressure fuel pump comes from the fuel tank and is closer to ambient temperature. The two streams of fuel are combined but little mixing ensues before the fuel enters the high pressure pump. This may result in slugs of fuel of different temperatures being provided to the high pressure pump. When the pump is provided a slug of the hotter fuel, it can exceed the maximum design temperature of the high pressure fuel pump. Furthermore, pump durability may be adversely impacted by rapidly changing fuel temperatures associated with insufficient mixing of return fuel and tank fuel. According to the prior art configuration with return fuel teeing into the low pressure line in between high and low pressure pumps, such inadequate mixing results.

SUMMARY

A fuel supply system for an internal combustion engine has pressure-intensifying fuel injectors mounted in combustion chambers of each cylinder. A fuel rail supplies fuel from the high pressure pump to the fuel injectors via individual injector lines. The high pressure pump is supplied fuel by a low pressure fuel pump via a low pressure fuel line having a fine filter disposed therein. Fuel return lines are coupled between each fuel injector and the low pressure line with the fuel return lines coupled with the low pressure line upstream of the fine filter. A fuel rail return line is coupled to each fuel rail and returns fuel to the fuel tank through a fuel cooler. Common rail type high pressure fuel systems typically utilize low pressure and high pressure pumps.

In another embodiment, unit injectors have the pressure intensification performed internally within the injector. Some of these systems do not employ a high pressure fuel pump. They do, however, have a low pressure fuel pump providing fuel to the unit injectors by a low pressure fuel line with a fine filter disposed therein.

In one embodiment, the pressure intensifying fuel injectors are piezoelectric style injectors that use hydraulic intensifiers to actuate the injector. Injectors with hydraulic intensifying actuators operate more reliably having a back pressure, or operational pressure, of at least a certain level on the fuel return lines coupled to the injectors.

In one embodiment, a fuel system for an internal combustion engine includes a low pressure fuel pump that pumps fuel through a fine filter to a high pressure fuel pump that in turn delivers pressurized fuel to corresponding fuel injectors via a fuel rail with a fuel return line coupled to the fuel injectors and to a low pressure fuel line between the low pressure fuel pump and the fine filter. Return fuel from the fuel rail(s) is routed back to the fuel tank through a fuel cooler to reduce the average temperature of fuel supplied to the high pressure pump and avoid pockets or slugs of high temperature fuel within the high pressure pump.

Embodiments of the present disclosure provide various advantages. For example, coupling the injector return fuel line back to the main fuel supply line upstream of the fine filter obviates the need for a filter to be provided in the return fuel line. This simplifies the fuel system, packages easier, reduces the number of connections, and reduces the number and size of the secondary filters to be maintained/replaced during the life of the vehicle, and may improve customer satisfaction. This location is also more robust with respect to potential manufacturing contamination as the amount of unfiltered fuel volume and connections that could be contaminated from manufacturing is reduced significantly.

According to an embodiment of the present disclosure, the two fuel streams are teed together upstream of the fine filter. In addition to removing debris from the fuel, the filter also acts to mix the two streams of fuel so that the fuel is well mixed prior to entering the high pressure fuel pump and at a homogeneous temperature. Thus, other advantages in returning the fuel prior to the fine filter include: preventing fuel higher than the maximum allowable temperature from entering the high pressure pump and avoiding rapid temperature swings of the fuel entering the pump.

In some prior art systems, both the leak off fuel from the fuel injectors and return fuel from the reservoir (or fuel rail) are circulated back to the upstream side of the low pressure pump via a filter. By recirculating both of these flows through the filter, the size of the filter is greater than would otherwise be required. Furthermore, this arrangement provides hot fuel to the high pressure fuel pump. Thus, another advantage of an embodiment of the present disclosure is that fuel leaking off the fuel rail does not overwhelm the high pressure fuel pump with hot fuel.

Another advantage in routing the injector return fuel into the fuel line in between the low pressure and high pressure pumps, as opposed to delivering the return fuel back to the fuel tank, is that the low pressure pump needn't pump the return quantity back to the high pressure pump. In prior art systems where return fuel is routed to the fuel tank, the low pressure pump supplies the amount of fuel consumed in the engine plus the return fuel quantity. Such prior art systems necessitate a larger pump capacity and consume more energy than a system according to one of the embodiments described herein.

By obviating a filter in the return line, the total volume of fuel within the return line is less than a system with a filter. By keeping the volume lower in the return line, the amount of volume which is pressurized to enable starting is less, i.e., the injector return line is pressurized more quickly so that the injectors are pressurized more quickly and starting time is reduced.

BRIEF DESCRIPTION OF THE DRAWINGS

FIG. 1 is a schematic drawing of the diesel fuel system according to an embodiment of the disclosure.

DETAILED DESCRIPTION

As those of ordinary skill in the art will understand, various features of the embodiments illustrated and described may be combined with other features to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to configurations of fuel systems for diesel engines. However, the present development also relates to engines fueled by gasoline or alternate fuels such as alcohol containing fuels. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

A fuel system 10 is shown in schematic form in FIG. 1. Fuel is drawn from fuel tank 12 by a low pressure pump 14 (often called a lift pump). A coarse filter 16 is placed in the line between fuel tank 12 and low pressure pump 14. As one example, coarse filter 16 removes all particles above 10 micrometers. Low pressure pump 14 provides fuel to high pressure pump 18 through a low pressure line 20 which has a fine filter 22 disposed therein. In one embodiment, fine filter 22 removes all particles larger than about 4 micrometers in diameter. High pressure pump 18 supplies fuel to fuel rail 24 via high pressure lines 25. In one alternative embodiment, only one high pressure line 25 is provided. Fuel rail 26 receives fuel from high pressure pump 18 from fuel rail 24 and crossover line 28. The embodiment shown in FIG. 1 is for an engine having two banks of cylinders and thus two fuel rails. A fuel system for a single bank of engine cylinders or an engine with a different number of cylinders is also within the scope of the present disclosure. In the embodiment shown, each of fuel rails 24 and 26 feed fuel through individual injector lines 30 to injectors 32. Each injector 32 is provided an injector return line connector 34 with associated return line connectors from each bank combined in a manifold and returned to low pressure fuel line 20. Restrictors 36 may be placed in the leak off lines. Restrictors 36 are commonly used to regulate and control injector return flow and back pressure. In most cases, restrictors 36 are effective when in the presence of fuel, i.e., not bubbles or foaming from air in the fuel. The fuel rail 24 has a fuel rail return line 38. A fuel cooler 40 may be provided in fuel rail return line 38 to extract energy that the fuel gained while in close proximity to the engine.

As also shown in FIG. 1, fuel rail 24 has a fuel rail return line 38 that returns fuel to fuel tank 12. A fuel cooler 40 may be provided in fuel rail return line 38 to cool the fuel by extracting heat energy associated with pressurization and heat energy that the fuel gained while in close proximity to hot engine components. According to this embodiment, the return fuel from the fuel rail(s) is routed to the fuel tank rather than being combined with the injector return fuel to reduce the average operating temperature of the fuel provided to high pressure fuel pump 18 and avoid heated fuel slugs reaching high pressure fuel pump 18. This also reduces the required size of fine filter 22 relative to systems that combine fuel rail return fuel and injector return fuel.

In operation, fuel from fuel tank 12 is pumped or lifted by low pressure fuel pump 14 through coarse filter 16. The output from low pressure pump 14 is connected to fine filter 22 and injector return line connectors 34 via low pressure line 20. Low pressure fuel of at least about 2 bar gauge from the output of low pressure pump 14 provides an operational back pressure to piezoelectric injectors 32 through restriction orifice 36. This low pressure fuel biases internal components of fuel injectors 32 to a desired starting position, i.e. prevents these components from collapsing, which improves starting performance and reduces the necessary capacity of the fuel pumps that would otherwise be required to pressurize the fuel system during starting.

Fuel from low pressure pump 14 is filtered by fine filter 22 and supplied to high pressure pump 18 where the pressure is increased at the outlet to about 2000 bar gauge. This high pressure fuel is delivered to fuel rails 24, 26 via high pressure lines 25. The majority of the high pressure fuel is delivered to corresponding cylinders via fuel injectors 32, with a small portion of fuel sent through return line connectors 34 and restriction orifice 36 to low pressure line 20 between low pressure pump 14 and fine filter 22. In this embodiment, a fuel rail return line 38 returns a portion of fuel from fuel rails 24, 26 back to fuel tank 12 through fuel cooler 40. This reduces the average temperature of fuel provided to the inlet of high pressure fuel pump 18 by mixing the fuel from fuel rails 24, 26 with fuel in tank 12. Similarly, heated fuel returned from injectors 32 is delivered downstream of low pressure pump 14, but upstream of fine filter 22 so that fine filter 22 filters and mixes the fuel with the lower temperature fuel from the outlet of low pressure pump 14 before being delivered to the inlet of high pressure pump 18.

As such, coupling the injector return fuel line upstream of the fine filter obviates the need for a separate fine filter to be provided in the return fuel line. This simplifies the fuel system, packages easier, reduces the number of connections, and reduces the number of filters to be maintained/replaced during the life of the vehicle. Combining injector return fuel and low pressure tank fuel upstream of the fine filter removes debris from the fuel while mixing the two streams of fuel so that the fuel is well mixed prior to entering the high pressure fuel pump to prevent high temperature fuel from entering the high pressure pump and to avoid rapid temperature swings of the fuel entering the pump. Likewise, routing fuel rail return fuel through a fuel cooler and back to the fuel tank reduces the fuel temperature entering the high pressure pump.

Routing the injector return fuel between the low pressure and high pressure pumps also lessens the capacity requirement of the low pressure pump relative to systems that route all return fuel to the fuel tank.

While the best mode has been described in detail, those familiar with the art will recognize various alternative designs and embodiments within the scope of the following claims. For example, the schematic fuel system depicted in FIG. 1 is for an engine with two banks. However, the disclosure applies also to single bank engine configurations. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed is:

1. A fuel system for an internal combustion engine having a low pressure fuel pump pumping fuel through a fine filter to a high pressure fuel pump that delivers pressurized fuel to corresponding fuel injectors via a fuel rail, the system comprising:
   a fuel return line coupling the fuel injectors into a low pressure fuel line between the low pressure fuel pump and the fine filter, the fuel return line permitting bidirectional flow between the low pressure fuel pump and the injectors to bias internal injector components to a desired starting position;
   a restrictor disposed in the fuel return line upstream of the fine filter;
   a fuel rail return line coupled between a first fuel rail and a fuel tank;
   a single fuel cooler disposed only in the fuel rail return line;
   a second fuel rail with a first portion of fuel injectors coupled to the first fuel rail, a second portion of fuel injectors coupled to the second fuel rail, and the high pressure line coupled to one of the fuel rails; and
   a cross-over line coupled between the first fuel rail and the second fuel rail.

2. The system of claim 1 further comprising a manifold combining fuel from a plurality of fuel injectors and coupled to the return line upstream of the low pressure fuel line.

3. The system of claim 1, further comprising:
   a supply line with one end in the fuel tank and the other end coupled to the low pressure pump.

4. The system of claim 3, further comprising:
   a coarse filter disposed in the supply line upstream of the low pressure pump.

5. A fuel system for an internal combustion engine, comprising:
   a fuel tank;
   a low pressure pump coupled to the fuel tank via a supply line;
   a high pressure pump supplied fuel by the low pressure pump via a low pressure line;
   a fine filter disposed in the low pressure line;
   a fuel injector supplied fuel by the high pressure pump via a high pressure line;
   a return line coupled between the fuel injector and the low pressure line without any valves and teeing into the low pressure line upstream of the fine filter to facilitate pressurizing the return line and the fuel injector using the low pressure pump;
   a restrictor disposed in the return line;
   a fuel rail return line coupled between a first fuel rail and the fuel tank;
   only a single fuel cooler, the single fuel cooler disposed in the fuel rail return line; and
   a second fuel rail with a first portion of fuel injectors coupled to the first fuel rail, a second portion of fuel injectors coupled to the second fuel rail, and the high pressure line coupled to one of the fuel rails;
   a cross-over line coupled between the first fuel rail and the second fuel rail.

6. The fuel system of claim 5, further comprising:
   a coarse filter disposed in the supply line upstream of the low pressure pump.

7. The fuel system of claim 5 wherein the fuel supply system comprises a plurality of fuel injectors, the high pressure line comprises two fuel rails and an injector line to each fuel injector, the system further comprising:
   a return line connector coupled to each fuel injector and coupled to the return line.

8. The fuel system of claim 5 wherein the fuel supply system comprises a plurality of fuel injectors, the system further comprising:
   a plurality of injector lines feeding fuel to each of the plurality of fuel injectors from the first and second fuel rails.

9. The fuel system of claim 1 wherein the restrictor allows fuel to flow through in both directions.

10. The fuel system of claim 5 wherein the restrictor comprises an orifice.

11. A fuel circuit, comprising:
    a fuel tank;
    a low pressure pump;
    a high pressure pump that is supplied fuel from the fuel tank via the low pressure pump;
    a first fuel rail coupled to the high pressure pump;
    a fuel rail return line coupled to the fuel tank;
    a fuel injector coupled to the fuel rail;
    a fuel injector return line returning fuel from the injector to a line between the pumps, the fuel injector return line allowing bidirectional fuel flow between the low pressure bump and the fuel injector;
    a restrictor in the fuel injector return line;
    a single fuel cooler disposed only in the fuel rail return line;
    a second fuel rail with a first portion of fuel injectors coupled to the first fuel rail, a second portion of fuel injector coupled to the second fuel rail, and the high pressure line coupled to one of the fuel rails; and
    a cross-over line coupled between the first fuel rail and the second fuel rail.

12. The fuel circuit of claim 11, wherein the restrictor is an orifice of a predetermined diameter.

13. The fuel circuit of claim 11, wherein the restrictor allows flow in both directions.

14. The fuel circuit of claim 11, further comprising:
    a coarse filter disposed in a line between the fuel tank and the low pressure pump.

15. The fuel circuit of claim 11, further comprising:
    a fine filter in a line between the low pressure pump and the fuel rail.

16. The fuel circuit of claim 15, wherein the restrictor is disposed in the return fuel line upstream of the fine filter.

17. The fuel circuit of claim 11, further comprising:
a second restrictor in the fuel rail return line.

18. A fuel system for an internal combustion engine, comprising:
- a low pressure pump connected to a high pressure pump;
- a fuel rail coupled to the high pressure pump and at least one injector;
- a return line returning fuel from the at least one injector to a line between the fuel pumps, the return line allowing bidirectional fuel flow between the low pressure pump and the at least one fuel injector to pressurize injector components.

19. The fuel system of claim 18 wherein the return line is connected to the at least one injector without any intervening valves.

* * * * *

UNITED STATES PATENT AND TRADEMARK OFFICE
Certificate

Patent No. 8,251,046 B2                                                            Patented: August 28, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Bradley Allen Brown, Leonard, MI (US); Larry Castleberr, Detroit, MI (US); Brien Lloyd Fulton, West Bloomfield, MI (US); Scott James Szymusiak, Canton, MI (US); and Carlos Armesto, Canton, MI (US).

Signed and Sealed this Ninth Day of July 2013.

*STEPHEN K. CRONIN*
*Supervisory Patent Examiner*
*Art Unit 3747*
*Technology Center 3700*